(12) United States Patent
Hoffmann

(10) Patent No.: US 8,985,962 B2
(45) Date of Patent: Mar. 24, 2015

(54) STIRRER ORGAN IN COMPOSITE CONSTRUCTION

(75) Inventor: Frank Hoffmann, Castrop-Rauxel (DE)

(73) Assignees: SICcast Mineralguss GmbH & Co. KG, Witten (DE); EKATO Ruehr- und Mischtechnik GmbH, Schopfheim (DE)

( * ) Notice: Subject to any disclaimer, the term of this patent is extended or adjusted under 35 U.S.C. 154(b) by 1099 days.

(21) Appl. No.: 12/928,875

(22) Filed: Dec. 22, 2010

(65) Prior Publication Data

US 2012/0163118 A1    Jun. 28, 2012

(51) Int. Cl.
| | | |
|---|---|---|
| *B01F 7/00* | (2006.01) | |
| *B23P 6/00* | (2006.01) | |
| *B23P 15/04* | (2006.01) | |
| *B05D 7/14* | (2006.01) | |

(52) U.S. Cl.
CPC .............. *B23P 6/00* (2013.01); *B01F 7/00025* (2013.01); *B23P 15/04* (2013.01); *B05D 7/14* (2013.01)
USPC ..................... 416/229 R; 29/889.1; 29/889.71

(58) Field of Classification Search
CPC .................................................. B01F 7/00025
USPC ..... 416/229 R, 230, 229 A; 29/889.1, 889.71
See application file for complete search history.

(56) References Cited

U.S. PATENT DOCUMENTS

| | | | | |
|---|---|---|---|---|
| 2,333,555 A | * | 11/1943 | Prucha | ............................. 416/91 |
| 3,068,556 A | * | 12/1962 | Kramer | ...................... 29/889.71 |
| 3,390,447 A | * | 7/1968 | Mears | ............................ 228/174 |
| 2001/0025417 A1 | * | 10/2001 | Fried et al. | .................... 29/889.1 |
| 2010/0162565 A1 | * | 7/2010 | Mukherji et al. | ............. 29/889.1 |

FOREIGN PATENT DOCUMENTS

| | | |
|---|---|---|
| DE | 297 23 409 | 9/1998 |
| DE | 201 11 789 | 9/2001 |

OTHER PUBLICATIONS

DIN 24 042, Oct. 1981, 4 pages. (Spec, p. 5).

\* cited by examiner

*Primary Examiner* — David Sorkin
(74) *Attorney, Agent, or Firm* — Collard & Roe, P.C.

(57) ABSTRACT

The invention relates to a stirrer organ (1) in composite construction comprised of a metallic part (4) and a hybrid casting (9), with the hybrid casting (9) being fixed to the metallic part (4) by means of at least one anchoring element which forms at least one back-cutting in the hybrid casting (9). Furthermore, the present invention relates to a method for rehabilitating a damaged metallic stirrer organ which when applied provides a rehabilitated stirrer organ (1) in composite construction. The invention tackles the task of creating a stirrer organ (1) in hybrid construction which features a largest possible metallic part (4) because higher strength can hereby be achieved. This task is inventively solved in that the anchoring element is provided with a perforated plate (5) which is spot-wise fastened to the metallic part (4) and which is arranged at least partly at a small distance to the surface of the metallic part (4) so as to configure the at least one back-cutting.

9 Claims, 2 Drawing Sheets

STIRRER ORGAN IN COMPOSITE CONSTRUCTION

Figure 1:
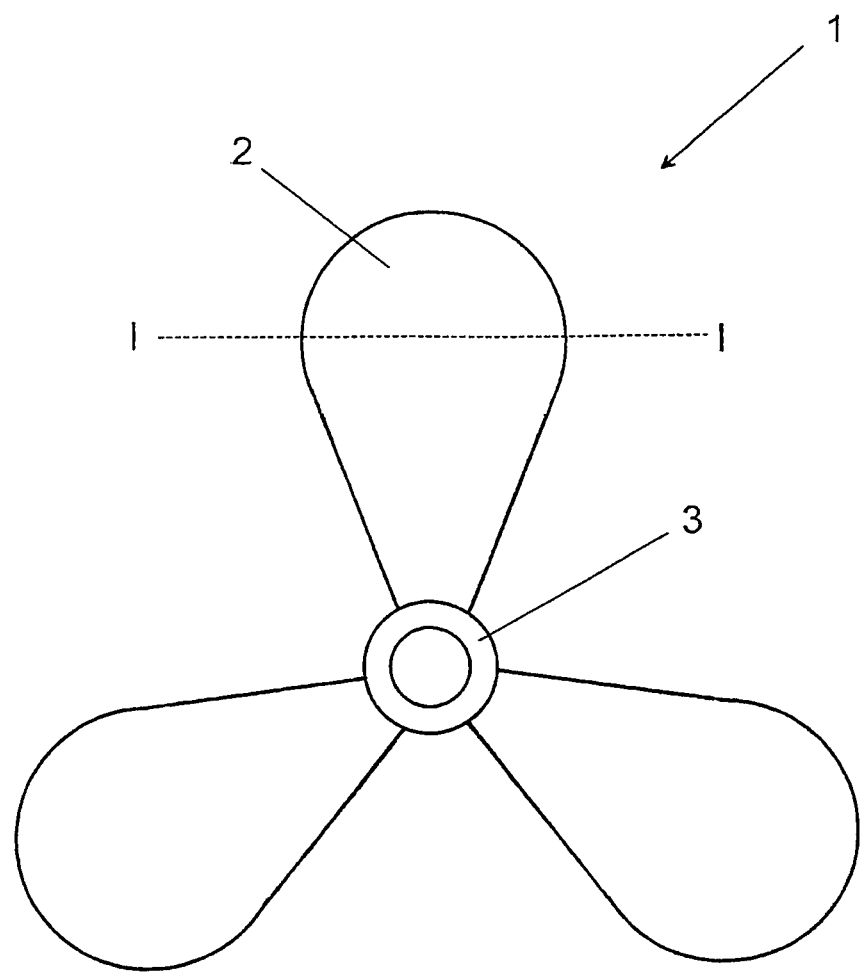

The present invention relates to a stirrer organ in composite construction comprised of a metallic part and a hybrid casting, with the hybrid casting being fixed to the metallic part by means of at least one anchoring element which forms a back-cutting in the hybrid casting.

Furthermore, the present invention relates to a method for rehabilitating a damaged metallic stirrer organ which when applied provides a rehabilitated stirrer organ in composite construction.

Stirrer organs of this species are applied in particular for stirring of corrosive and/or abrasive media. On account of their extraordinarily high chemical and mechanical stresses, stirrer organs are exposed to severe wear and tear. Until some years ago, these components were therefore made of high-alloy corrosion-resistant steel grades. Since it turned out to be impossible to achieve satisfying service life campaigns with these materials, first efforts have been made some time ago to substitute steel partly by hybrid castings.

Hybrid casting is to be understood hereunder as a mixture composed of a bonding agent and an aggregate. For example, the aggregate is a fine-grain wear-resistant and corrosion-proof material, e.g. silicon carbide, corundum, quartz sand, glass or even blends of these materials. Usable as bonding agents are plastic materials, e.g. epoxy resin, vinyl ester resin or polymethylmethacrylate (PMMA).

The German utility patent DE 201 11 789 U1 describes a stirrer organ in form of a metallic stirrer blade driven by a stirrer shaft. The end of the stirrer blade is provided with a protective cap made of hybrid casting. The protective cap is connected in a form-fit arrangement with the stirrer blade. To this effect, there are boreholes arranged in the stirrer blade which are interspersed with the hybrid casting when the stirrer blade end is cast around with the hybrid casting.

A disadvantage with this type of a form-fit connection between the hybrid casting and the metallic stirrer blade lies in that the hybrid casting is merely retained spot-wise by the hybrid casting webs arranged in the boreholes at the stirrer blade. If the hybrid casting is exposed to heavy loads, stress peaks are thus entailed in the area of the contact points between the borehole and the hybrid casting. The hybrid casting is hereby weakened locally and can be destroyed, whereby the hybrid casting part may at least partly loosen from the metallic stirrer blade.

For anchoring a hybrid casting at a metallic machinery component, it is furthermore known from DE 29723 409 U1 to utilize usual bolts as anchoring elements which are screwed into the metallic machinery component and the heads of which form back-cuttings in the hybrid casting, whereby a strong cohesion is established between the metallic machinery component and the hybrid casting.

This solution bears a drawback in that a large quantity of the hybrid casting must be cast in order to completely enclose the bolt heads. Thus the hybrid casting takes a substantial part of the overall thickness of the composite component. Since the overall thickness of the composite component is defined or at least limited by the hydrodynamic task to be fulfilled, the metallic part can therefore only have a low material thickness. However, since the metallic part represents the load-bearing basis for the composite component, it must be of the highest possible thickness to the benefit of the necessary strength. Large hybrid casting portions in a composite work piece thus frequently entail problems in strength.

Another drawback of this solution also rests in that the hybrid casting is retained by the bolts merely at certain points and spots. If the hybrid casting is exposed to heavy loads, stress peaks are entailed in the area of the contact points between the bolt and the hybrid casting. The hybrid casting is hereby weakened locally so that the hybrid casting part may at least partly loosen from the metallic part.

In view thereof, the technical problem underlying the present invention is to develop a stirrer organ of the species mentioned hereinabove in such a manner that the drawbacks outlined hereinabove are avoided.

This task is inventively solved in that the anchoring element is provided with a perforated plate which is spot-wise fastened to the metallic part and which is arranged at least partly at a small distance to the surface of the metallic part so as to configure the at least one back-cutting.

In this manner, the contact face between the hybrid casting and the anchoring element is markedly increased as compared with prior art. Hazardous stress peaks are thus avoided. Furthermore, the quantity of grouted mineral cast can be reduced to a minimum in this manner.

As the planar anchoring element is arranged closely along the surface of the metallic part, the hybrid cast rather resembles a coating which dependent on its viscosity can be cast-on or trowelled-on, with a hybrid cast having a relatively high viscosity being preferably trowelled-on. Moreover, the perforated plate takes a stabilizing and reinforcing effect in the entire casting body, so that the compound bonding of the inventive stirrer organ is markedly improved as compared with prior art. The portion of the load-bearing metallic part in the compound bonding, too, can be substantially enhanced without exceeding the given composite component thickness.

Now, therefore, the present invention advantageously extends the range of application of the hybrid casting technology to older, existing stirrer organs made of steel which are severely attacked by the media to be stirred. As a result hereof, these stirrer organs have to be replaced frequently, which particularly involves an extensive spare parts stock keeping.

Thanks to the present invention, it is now possible to rehabilitate attacked, metallic stirrer organs at low cost. For this purpose, damaged stirrer organs are cleaned or ground-off, provided with a perforated plate, and subsequently the protective hybrid cast is cast-on or trowelled-on. Initial tests have demonstrated that stirrer organs rehabilitated in this manner achieve a service life which is substantially longer than it were in their new status. Maintenance intervals for stirrer organs are enhanced, and spare parts stock keeping can be omitted.

The inventive use of the perforated plate is not confined to planar machinery components. It is also feasible to produce or rehabilitate composite components having a more complex geometry by covering the surface of the metallic part, for example, with a plurality of smaller perforated plates arranged like a patchwork.

An advantageous embodiment of the present invention provides for fastening the perforated plate indirectly via spacer pieces to the metallic part and arranging it by means of the spacer pieces partly at a small distance to the surface of the metallic part. The spacer pieces are preferably designed and built as washers, thus representing a simple and low-cost measure. In a particularly preferable manner, the distance pieces are fastened to the metallic part by applying the spot welding technique. This joining method can be performed quickly and cost-efficiently on the one hand, while the material properties of the metal are hardly altered by the short-term and spot-like thermal load on the other hand.

According to an alternative advantageous embodiment of the present invention, the perforated plate is directly fastened at fastening points to the metallic part by applying the spot welding technique, the perforated plate being arched away from the metallic part in at least one area between the fastening points and thus arranged partly at a small distance to the surface of the metallic part. According to this configuration, a use of spacer pieces can be dispensed with. Hereby it is possible to reduce the quantity of required hybrid cast to a minimum.

In accordance with a further advantageous embodiment of the present invention, the thickness of the perforated plate ranges between 0.2 and 2 mm. The relevant choice of thickness can be adapted individually to the relevant intended purpose of application. These plate thicknesses are already sufficient to achieve the afore-mentioned effect. Moreover, thin plates of this type are easy to process. The distance between the perforated plate and the surface of the metallic part preferably corresponds roughly to 1.5 times to double the thickness of the perforated plate. In practice it has been demonstrated that a distance within this interval is absolutely sufficient to fill-up a load-bearing casting underneath the perforated plate.

As the hybrid cast is quite tenacious, the perforated plate must have a high passage relative to the surface so as to allow it to be well flown through. This property is obtained by a perforated plate according to DIN 24 042 Form Qg, i.e. a perforated plate with a quadratic perforation in straight rows, wherein the distance of the quadratic holes stands in a certain relation to the dimensioning of the holes. Moreover, a wide-meshed perforated plate of this type causes less target points of rupture in the mineral casting layer than a close-meshed braiding.

The task outlined hereinabove is furthermore solved by applying a method of the initially mentioned type by taking the following steps:
a) the damaged areas of the metallic stirrer organ are cleaned or abraded;
b) spacer pieces are fastened on the metallic stirrer organ;
c) a perforated plate is so fastened at the spacers that it extends at a small distance to the surface of the metallic stirrer organ in the cleaned area and/or in the area of the abrasion;
d) in the area of the perforated plate a hybrid casting is cast-on or trowelled-on to the metallic stirrer organ so as to create a rehabilitated stirrer organ in composite construction.

The damaged areas of the metallic stirrer organ are preferably ground-off. The spacer pieces to be affixed to the metallic stirrer organ and/or the perforated plate to be affixed to the spacer pieces are preferably fastened by applying the spot welding technique.

According to the present invention, the task outlined hereinabove is alternatively solved by applying a method of the initially mentioned type by taking the following steps:
a) the damaged areas of the metallic stirrer organ are cleaned or abraded;
b) a perforated plate is directly affixed to the metallic stirrer organ at the fastening points by applying the spot welding technique;
c) at least in one area between the fastening points, the perforated plate is so bent away from the metallic stirrer organ to form at least one arch that in the cleaned area and/or in the area of the abrasion the perforated plate extends at a small distance to the surface of the metallic stirrer organ;
d) in the area of the perforated plate a hybrid casting is cast-on or trowelled-on to the metallic stirrer organ so as to create a rehabilitated stirrer organ in composite construction.

Here, too, the damaged areas of the metallic stirrer organ are preferably ground-off.

In accordance with the methods described hereinabove, it is possible to produce a rehabilitated stirrer organ in composite construction that may be configured according to one of the embodiments described hereinabove in connection with the stirrer organ in composite construction or in any arbitrary combination of the same.

A practical example of the present invention is more precisely elucidated based on the following figures, wherein:

FIG. 1: shows a practical example for an inventive stirrer organ; and

Figure 2:
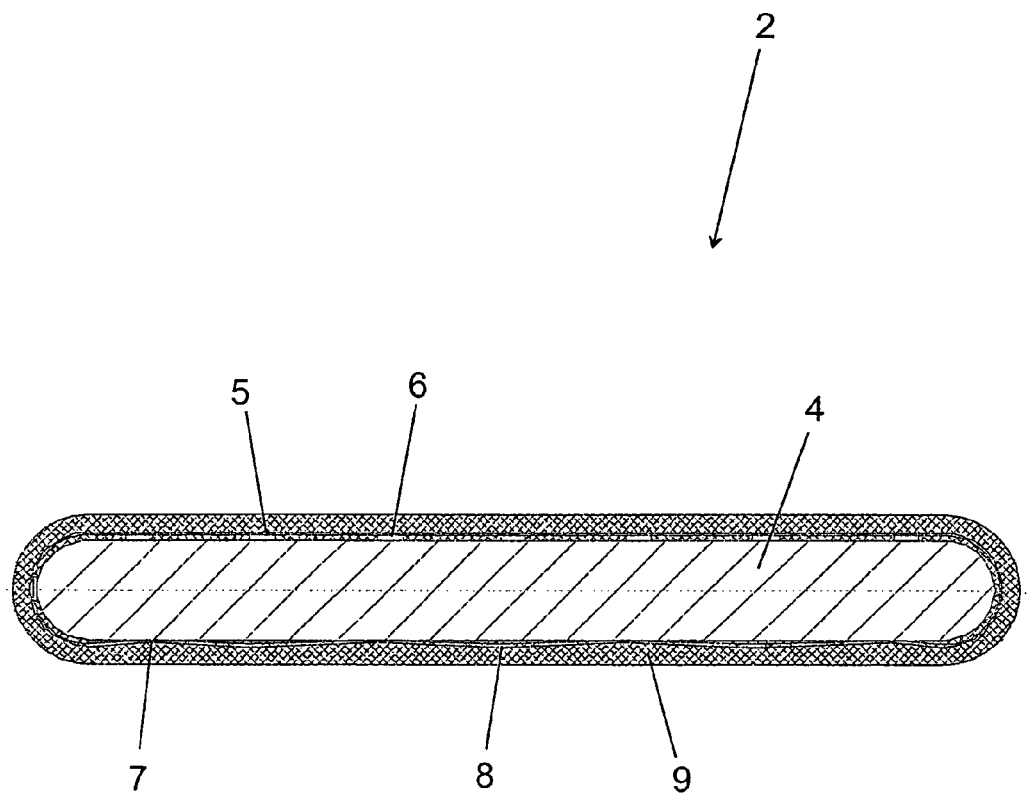

FIG. 2: shows a cross-section of the practical example shown in FIG. 1 along the line I-I.

FIG. 1 shows a top view onto a practical example for the inventive stirrer organ 1 in composite construction. According to this embodiment, the stirrer organ 1 is comprised of three stirrer blades 2 which are connected to each other via a hub 3. Via the hub 3, the stirrer organ 1 is connectible to a shaft not shown here, via which the stirrer organ 1 can be moved in the plane of the blade.

FIG. 2 shows a cross-section of the practical example shown in FIG. 1 along the line I-I. Hence, it represents a cross-section through a stirrer blade 2 of stirrer organ 1.

The stirrer blade 2 is comprised of a metallic part 4, which a perforated plate 5 is spot-wise fastened to and which is thus retained at a small distance to the surface of the metallic part 4 to configure back-cuttings. At the upper side of the metallic part 4, the perforated plate 5 is affixed via spacer pieces 6 to the metallic part 4. At the lower side of the metallic part 4, the perforated plate 5 is directly affixed to the metallic part 4 at fastening points 7 by applying the spot welding technique. Between the fastening points 7, the perforated plate 5 has been bent away from the metallic part 4 to configure arches 8 so that the perforated plate 5 in these areas is kept at a small distance to the surface of the metallic part 4 to configure back-cuttings.

In accordance with alternative embodiments, the perforated plate 5 can be fastened to the metallic part 4 exclusively indirectly via spacer pieces 6 or exclusively directly at fastening points 7.

The perforated plate 5 serves as anchoring element to anchor the hybrid casting 9 at the metallic part 4. When the perforated plate 5 has been fastened to the metallic part 4, this compound structure comprised of the perforated plate 5 and the metallic part 4 is cast around with a hybrid cast or the hybrid cast is trowelled-on accordingly so that part of the hybrid cast reaches through the non-shown holes in the perforated plate 5 and mainly completely fills the space between the perforated plate 5 and the metallic part 4. By way of the subsequent age-hardening of the hybrid cast, the hybrid casting 9 is formed which reaches through the holes of the perforated plate 5 and which reaches behind those areas of the perforated plate 5 not provided with holes and forming the inventive back-cuttings.

The practical example described based on these figures serves for explanatory purposes and is non-restrictive.

The invention claimed is:

1. Stirrer organ (1) in composite construction comprised of a metallic part (4) and a hybrid casting (9), with the hybrid casting (9) being fixed to the metallic part (4) by means of at least one anchoring element which forms at least one back-cutting in the hybrid casting (9), wherein the anchoring element is provided with a perforated plate (5) which is spot-wise fastened to the metallic part (4) and which is arranged at least partly at a small distance to the surface of the metallic part (4) so as to configure the at least one back-cutting.

2. Stirrer organ (1) according to claim 1, wherein the perforated plate (5) is fastened to the metallic part (4) indirectly via spacer pieces (6) and wherein it is arranged by means of the spacer pieces (6) partly at a small distance to the surface of the metallic part (4).

3. Stirrer organ (1) according to claim 2, wherein the spacer pieces (6) are designed and built as washers.

4. Stirrer organ (1) according to claim 2, wherein the spacer pieces (6) are fastened to the metallic part (4) by applying the spot welding technique.

5. Stirrer organ (1) according to claim 1, wherein the perforated plate (5) is indirectly fastened to the metallic part (4) at fastening points (7) by applying the spot welding technique, the perforated plate (5) being arched-away from the metallic part (4) in at least one area between the fastening points (7), thus being partly arranged at a small distance to the surface of the metallic part (4).

6. Stirrer organ (1) according to claim 1, wherein the thickness of the perforated plate (5) ranges between 0.2 and 2 mm.

7. Stirrer organ (1) according to claim 6, wherein the small distance between the perforated plate (5) and the surface of the metallic part (4) roughly corresponds to 1.5 times to double the thickness of the perforated plate (5).

8. Stirrer organ (1) according to claim 1, wherein the perforated plate (5) has a plurality of rectangular perforations in straight rows.

9. Stirrer organ (1) according to claim 1, wherein the hybrid cast is applied by casting-on or trowelling-on.

* * * * *